(12) United States Patent
Johri et al.

(10) Patent No.: US 9,604,635 B1
(45) Date of Patent: Mar. 28, 2017

(54) INHIBIT ENGINE PULL-DOWN BASED ON PAST DRIVING HISTORY

(71) Applicant: Ford Global Technologies, LLC, Dearborn, MI (US)

(72) Inventors: Rajit Johri, Canton, MI (US); Xiaoyong Wang, Novi, MI (US); Jeffrey Allen Doering, Canton, MI (US); Mark Steven Yamazaki, Canton, MI (US); Ming Lang Kuang, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/859,922

(22) Filed: Sep. 21, 2015

(51) Int. Cl.
| | | |
|---|---|---|
| *B60L 9/00* | (2006.01) | |
| *B60W 10/04* | (2006.01) | |
| *B60W 20/00* | (2016.01) | |
| *B60W 10/02* | (2006.01) | |
| *B60W 10/06* | (2006.01) | |
| *B60K 6/442* | (2007.10) | |
| *B60K 6/547* | (2007.10) | |

(52) U.S. Cl.
CPC ............ *B60W 20/40* (2013.01); *B60K 6/442* (2013.01); *B60K 6/547* (2013.01); *B60W 10/02* (2013.01); *B60W 10/06* (2013.01); *B60W 2540/10* (2013.01); *B60W 2540/18* (2013.01); *B60W 2550/142* (2013.01); *B60W 2710/021* (2013.01); *B60Y 2200/92* (2013.01); *B60Y 2300/182* (2013.01); *B60Y 2300/192* (2013.01); *B60Y 2300/42* (2013.01); *B60Y 2300/43* (2013.01); *Y10S 903/93* (2013.01)

(58) Field of Classification Search
USPC ............................................ 701/22; 477/203
See application file for complete search history.

(56) References Cited

U.S. PATENT DOCUMENTS

| 8,821,348 | B2 | 9/2014 | Yu et al. | |
|---|---|---|---|---|
| 8,924,055 | B2 | 12/2014 | Shimodaira et al. | |
| 2002/0107632 | A1* | 8/2002 | Fuse | B60K 6/543 701/112 |
| 2002/0163794 | A1* | 11/2002 | Hayami | B60Q 1/12 362/40 |
| 2003/0144773 | A1* | 7/2003 | Sumitomo | B60K 6/442 701/22 |
| 2007/0255478 | A1* | 11/2007 | Wakashiro | B60K 6/442 701/93 |

(Continued)

*Primary Examiner* — Tyler Paige
(74) *Attorney, Agent, or Firm* — David B. Kelley; Brooks Kushman P.C.

(57) ABSTRACT

A hybrid vehicle includes an engine and a motor that are both capable of powering the wheels. While a vehicle is being driven, the vehicle's driving condition data is monitored. The driving condition data can include steering wheel angle or position, accelerator pedal position, driver torque or power demands, or road grade or incline. The vehicle includes a controller with a specific control scheme to receive the driving condition data, and subject the data to a moving average or a weighted moving average. Based on the averaged driving condition data, the engine is inhibited from stopping under certain conditions to reduce the frequency of the engine turning on and off.

17 Claims, 5 Drawing Sheets

(56) References Cited

U.S. PATENT DOCUMENTS

| | | | |
|---|---|---|---|
| 2009/0222156 A1* | 9/2009 | Krueger | B60L 7/26 701/22 |
| 2010/0175944 A1* | 7/2010 | Hayashi | B60K 6/445 180/242 |
| 2010/0280721 A1* | 11/2010 | Marcigliano | B60W 30/19 701/54 |
| 2011/0168469 A1* | 7/2011 | Hansson | B60W 10/02 180/65.275 |
| 2012/0078456 A1* | 3/2012 | Hakumura | B60L 3/003 701/22 |
| 2012/0325573 A1* | 12/2012 | Miller | B60L 7/24 180/282 |
| 2013/0179014 A1* | 7/2013 | Yamazaki | B60W 10/06 701/22 |
| 2013/0282215 A1* | 10/2013 | Makabe | B60W 20/40 701/22 |
| 2014/0066255 A1* | 3/2014 | Yu | F02N 11/0822 477/203 |
| 2014/0066256 A1* | 3/2014 | Yu | F02N 11/0822 477/204 |
| 2014/0100727 A1* | 4/2014 | Pietron | B60W 10/02 701/22 |
| 2014/0163799 A1 | 6/2014 | Niimi | |
| 2015/0105949 A1 | 4/2015 | Wright et al. | |
| 2015/0336606 A1* | 11/2015 | Shibuya | B60W 10/02 180/444 |

* cited by examiner

INHIBIT ENGINE PULL-DOWN BASED ON PAST DRIVING HISTORY

TECHNICAL FIELD

This disclosure relates to a control strategy for inhibiting engine pull-down in a hybrid vehicle based on past driving history of various factors.

BACKGROUND

In a hybrid electric vehicle (HEV), either or both of an internal combustion engine and an electric motor are capable of supplying power to the wheels of the vehicle. Various architecture of HEVs are known. For example, in a "series" hybrid drive train, there is no mechanical coupling of the engine to the wheels. Instead, the engine acts as a power generating unit, and its energy output is converted into electric energy stored in a battery for use by a main traction motor. In a "parallel" hybrid drive train, the engine can be selectively coupled to the wheels, as can the traction motor. Either or both of the engine and motor can provide propulsion power to the wheels. Other hybrid architectures are known, such as "series-parallel" hybrids.

Hybrid vehicles are desirable for increased fuel efficiencies. To better conserve fuel, processors in the vehicle are specifically programmed to stop or "pull-down" the engine during times that the engine is not needed to propel the vehicle. For example, the engine can be pulled-down and kept off when the power demands from the driver are relatively minimal such that the motor can fulfill all propulsion power demands. When the driver power demand increases such that the electric motor cannot provide enough power to meet the demand, the engine may be activated or "pulled-up" to fulfill the power demand.

Excessive stops and starts of the engine can lead to reduced comfort and drivability perceived by the occupants of the vehicle, as well as reduced fuel economy. When power demands change often and abruptly during a drive, the engine may start and stop an undesirable amount of times. Control strategies are known in the art to use filters or other algorithms to "learn" the driving habits of a driver and correspondingly reduce the frequencies of engine starts and stops.

SUMMARY

According to one embodiment of this disclosure, a vehicle comprises a steering wheel with an associated steering wheel angle sensor, an engine, a transmission, and a motor-generator capable of providing drive torque. The motor-generator is also selectively coupled to the engine via a clutch, and selectively coupled to the transmission. The vehicle includes at least one controller programmed to inhibit the clutch from disengaging and the engine from stopping based on a moving average of previous steering wheel angle positions exceeding a threshold.

According to another embodiment, a vehicle comprises an accelerator pedal with an associated pedal position sensor. The vehicle also includes an engine, a transmission, and a motor-generator capable of providing drive torque. The motor-generator is also selectively coupled to the engine via a clutch and selectively coupled to the transmission. The vehicle includes at least one controller programmed to inhibit the clutch from disengaging and the engine from stopping based on a moving average of previous pedal position magnitudes exceeding a threshold.

In yet another embodiment, a method of inhibiting engine pull-down in a vehicle is provided. The method includes (1) receiving a signal indicative of driving-condition data relating to road grade, accelerator pedal position, or steering wheel position, (2) initializing a timer in response to an engine-stop request, and (3) subsequent to the initializing, inhibiting the engine from stopping based on a moving average of the driving-condition data and the timer being unexpired.

BRIEF DESCRIPTION OF THE DRAWINGS

FIG. 3A is a graphical illustration of comparing accelerator pedal position to two different thresholds to stop and start the vehicle, while

FIG. 4A is a graphical illustration of a moving average of steering angle over time and an associated inhibit-engine-pull-down threshold, while FIG. 5A is another graphical illustration of a moving average of steering angle over time and an associated inhibit-engine-pull-down threshold, while

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
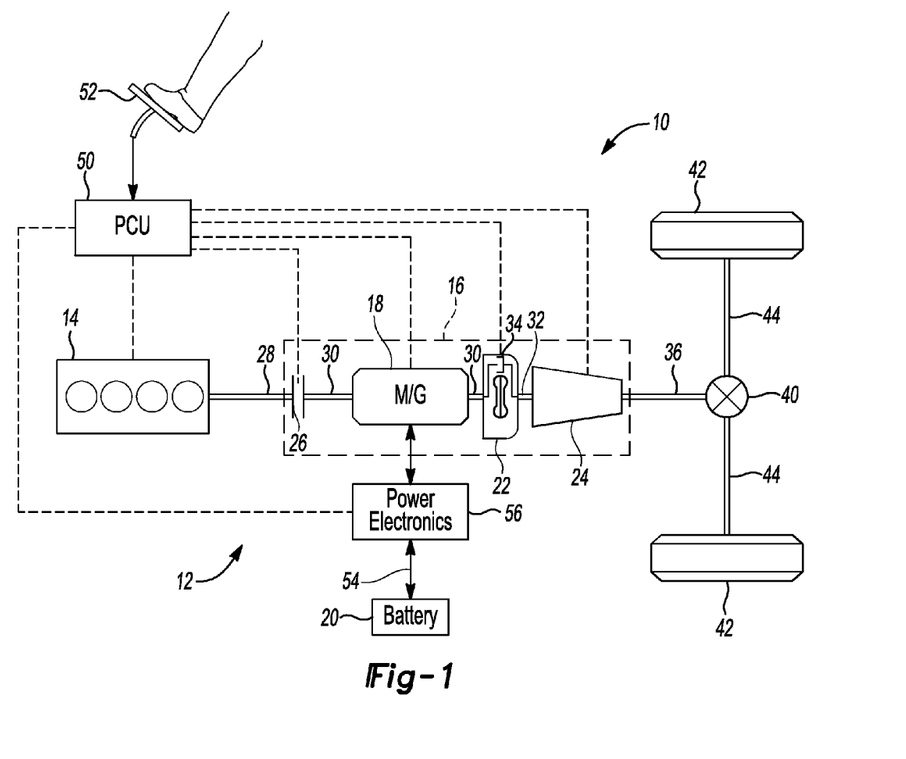
FIG. 1 is a schematic representation of a hybrid vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

As described above, the controller 50 is programmed to cause specific actions in the powertrain to occur during operation of the vehicle. The controller 50 can include software with a Powertrain Mode Manager (PMM) feature that commands the various drive modes explained above. While changing between drive modes, the engine may be commanded to start or stop. For example, when conditions dictate the PMM to switch from the hybrid mode to the electric-only mode, the engine 14 is commanded to turn off or "pull down." Inversely, if conditions dictate the PMM to switch from the electric-only mode to the hybrid mode, the engine is commanded to turn on or "pull up."

Engine pull-up or pull-down requests and drive mode selections made by the controller 50 depend on various factors, such as, for example, accelerator pedal position and total driver power or torque demands. Excessive fluctuation of these factors could cause corresponding fluctuations in engine start or stop commands without some active control to prevent the engine from stopping and starting too often.

For certain vehicle maneuvers, the controller might command an unnecessary amount of engine starts and stops. Such vehicle maneuvers include steering into and out of a corner, temporary changes in road grade, or erratic accelerator pedal positions leading to erratic driver demand. For example, consider a scenario in which the engine is on and the vehicle enters a corner. The driver may lift his foot from the accelerator pedal while entering the corner. This may cause the PMM logic in the controller to command the engine to turn off based on the reduced driver demand. However, as soon as the vehicle exits the curve, the driver may depress the accelerator pedal again, causing the controller to command a start of the engine. This short amount of engine shutdown time can lower driver comfort and have the potential to result in reduced fuel economy due to the energy spent in starting the engine. The present disclosure provides a control strategy to account for driving scenarios such as these, and correspondingly alter the PMM logic in the controller by inhibiting engine pull-down under certain situations.

Engine pull-downs can particularly occur due to changes in the road grade, the accelerator pedal position (i.e., driver demand), or the steering angle. Various accelerometers and sensors are placed throughout the vehicle and relay information regarding changes in the road grade, the accelerator pedal position, and the steering angle to the controller for determining what mode of operation the vehicle should operate under. For example, an accelerator pedal position sensor aids in determining driver demands; a steering wheel angle or position sensor aids in determining steering energy in and out of a turn; force sensors, GPS technology, accelerometers, or visual (e.g., radar) sensors can aid in determining road grade. Data regarding the road grade, accelerator pedal position, and steering angle is sent to the controller 50, and the PMM correspondingly determines which mode to command the vehicle to operate under. This data sent to the controller can be referred to as driving-condition data.

According to various aspects of the present disclosure, a moving average of various driving-condition data is used in determining whether an engine-pull down should be inhibited even though current driving conditions may normally command an engine pull-down. A moving average of past driving-condition data enables the controller to use past driving habit information to infer current or future driving habit information and inhibit engine pull-down. While common filters are used to smoothen fluctuations or noise in data, common filters may not accurately inhibit engine pull-downs or pull-ups in certain driving scenarios. The moving average utilized in this present disclosure better accounts for fluctuations in road grade, accelerator pedal position, and steering wheel angle.

A moving average is a data-analysis tool that that creates a series of averages of different subsets of the full data set. A weighted moving average is one type of moving average, and can be particularly beneficial for the driving condition data in this disclosure. In a weighted moving average, the driving condition data is recorded and weighted less heavily as time goes on. In other words, weight is placed on the driving condition data to an amount that decreases in progression; the latest data is weighted most heavily. An exponential moving average can also be utilized, in which the weighting for each older datum point decreases exponentially.

Figure 2:
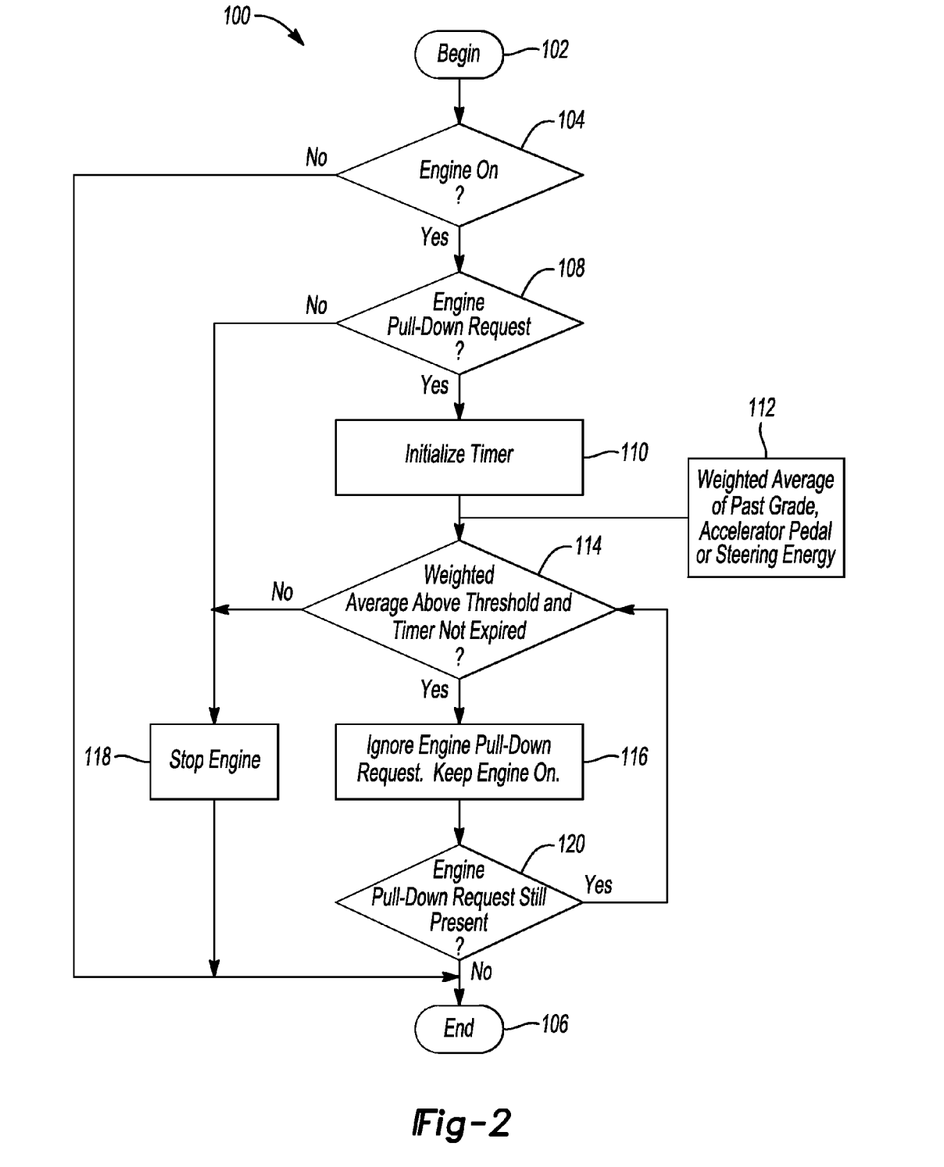
FIG. 2 is a flow chart of an exemplary algorithm for inhibiting an engine pull-down based on a weighted average of past driving condition data.

FIG. 2 is a flow chart of an exemplary algorithm 100 for inhibiting an engine pull-down based on a weighted average of past driving condition data. When the controller implements this algorithm, the weighted average of the past driving condition data can reduce the frequency of engine stops and starts during driving, improving drivability and fuel economy.

The algorithm begins at 102. At 104, the controller determines whether the engine is on or off. If the engine is off, the algorithm can end at 106. If the engine is on (e.g., the vehicle is in the hybrid mode of operation or the engine-only mode of operation), the controller continuously monitors various data at 108 to determine whether there is an engine pull-down request. As explained above, an engine pull-down request may be ordinarily made due to a reduced driver demand, an increased battery charge, or other factors that lead the controller to infer that the engine can be shut down to conserve fuel. If no engine pull-down request is made or received, the control strategy ends and returns at 106.

Upon receiving an engine pull-down request, a timer is initialized at 110. The timer can be any programmable time value, and in particular embodiments is in the range of 0.5-2.0 seconds. At 112, the road condition data (e.g., the data indicating the road grade, accelerator pedal position, and steering angle) are subjected to a weighted average, as explained above. For example, the road condition data can be recorded on a storage medium as the vehicle travels, and can be recalled for purposes of using the weighted average, in which most-recent driving condition data is weighted heavier than older driving condition data.

At 114, the weighted average of the past road condition data is compared to a threshold. This threshold is a programmable and can be altered for different driving modes or in different vehicles. This threshold dictates whether the engine should in fact be pulled down, or should remain on. For example, weighted average of the road condition data below the threshold indicates a true desire to stop the engine, while weighted average of the road condition data remaining above the threshold indicates a true desire to keep the engine on. In this exemplary algorithm, if the weighted average of the road condition data increases above the threshold while the timer has not expired, the algorithm proceeds to 116. If, however, the weighted average of the road condition data does not exceed the threshold or the timer has expired, the engine is stopped at 118.

At 116, in response to the weighted average exceeding the threshold before the timer expires, the engine pull-down request is ignored and the engine is inhibited from being stopped. The engine thus remains on even though current driving conditions might otherwise dictate that the controller stop the engine to conserve fuel. The controller then continually checks to assure the engine pull-down request is still present at 120. While the engine pull-down request remains present, the algorithm keeps comparing the weighted average to the threshold. Once the timer has expired with the weighted average still above the threshold, or if the weighted average falls below the threshold, as indicated at 114, the engine is finally allowed to stop at 118. The engine is no longer inhibited from stopping and can follow the commands of the engine pull-down request.

Figure 3A:
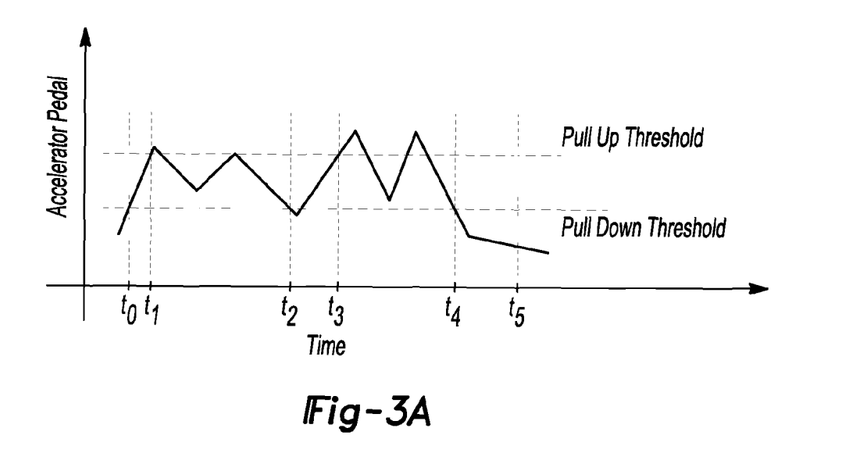

FIG. 3A illustrates a raw or filtered accelerator pedal position over time. Like FIG. 3A illustrates, a conventional hybrid system can use a first threshold that, when exceeded by accelerator pedal position, causes the engine to start (i.e., "pull-up threshold"). This pull-up threshold is an indicator of driver demand; thus, when the accelerator pedal position exceeds the pull-up threshold, driver demand is high and the engine is commanded by the controller to start. The system can also use a second threshold. When the accelerator pedal position falls below the second threshold, the controller commands the engine to stop (i.e., "pull-down threshold"). The use of two different and separated thresholds allows a time delay between engine starts and stops, and can provide a hysteresis as to when to activate and shut down the engine.

Looking at FIG. 3A in specific, prior to time $t_0$, the vehicle is operating in the electric-only mode or another mode in which the engine is off and not providing any drive torque. At time $t_1$, the accelerator pedal position exceeds the pull-up threshold, and so the engine is started. The vehicle thus operates in the hybrid-mode, the engine-only mode, or another mode in which the engine is on and provides drive torque. As the accelerator pedal position fluctuates and even falls below the pull-up threshold, the engine remains on until time $t_2$ when the accelerator pedal falls below the pull-down threshold. This returns the engine to the electric-only mode or another mode in which the engine is off. Shortly thereafter, the driver punches the accelerator pedal quickly, as indicated at time $t_3$ in which the accelerator pedal position exceeds the pull-up threshold once again. This starts the engine. The engine remains on until time $t_4$, in which the accelerator pedal falls below the pull-down threshold. At that time, the engine once again stops. The engine remains off as the driver begins to coast with the accelerator pedal position remaining relatively low and below both thresholds.

As illustrated by this embodiment, quick variations in the accelerator pedal can lead to corresponding quick changes in the engine operation. For example, the engine shuts down at time $t_2$, but quickly starts again at time $t_3$ when the accelerator pedal exceeds the pull-up threshold. These harsh driving conditions and frequent engine-operation changes can affect drivability, as the driver experiences the engine turning on and off at an undesirable rate.

Figure 3B:
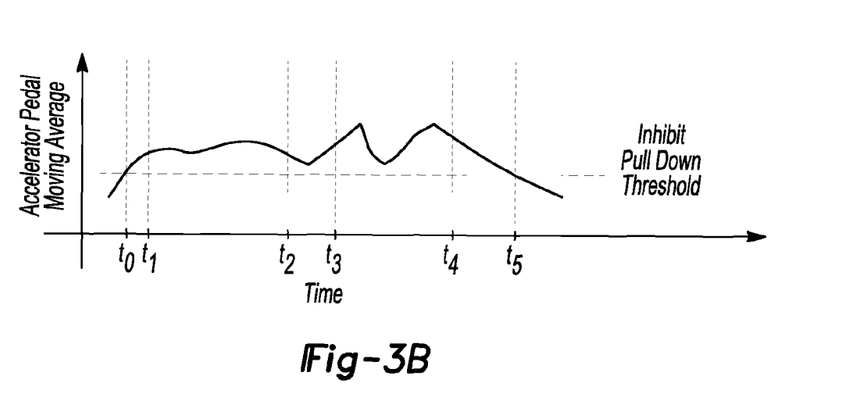
FIG. 3B is a graphical illustration of a moving average of accelerator pedal position over time compared to a single threshold.

As explained above, moving average of various driving-condition data can be used to inhibit an engine-pull down. The vehicle controls can be implemented with a moving average placed on the accelerator pedal position data to improve the drivability. One example of a moving average is shown below:

$$Y = \frac{\sum (W_i * X_i)}{\sum W_i}$$

where Y is the weighted average of the accelerator pedal position, W is the weights as a function of the number (N) of past time interval, and X is the number past number (N) of accelerator pedal values with weights weighted more toward the nearest past values. The weights being weighted heavier more toward the nearest past values provides a weighted moving average, as discussed above as one example of a moving average. The weighted moving average acts like a low pass filter and smoothens out the accelerator pedal position history, as shown comparing FIG. 3B to FIG. 3A.

Referring to FIG. 3B, there is one threshold instead of two: an "inhibit pull-down threshold." The graph of FIG. 3B is intended to illustrate the results of a supplemental control strategy, and supplements the results graphed in FIG. 3A. In FIG. 3A, the controller reacts to two thresholds (pull-up threshold and pull-down threshold) to control the engine. However, in FIG. 3B, pull-down requests are now also compared against a single weighted-average threshold. The control strategy that yields results shown in FIG. 3A can be either supplemented or replaced by the control strategy of FIG. 2 and the corresponding yielded results of FIG. 3B.

With initial accelerator pedal movement prior to time $t_0$, the moving average of the accelerator pedal position has already increased passed the inhibit pull-down threshold. While the moving average of the accelerator pedal position remains above this threshold, the control system will inhibit or prevent the engine from pulling-down, or stopping. This control can be placed regardless of the state of the engine. For example, the control system can inhibit the engine from being stopped even if the engine has not started; once the engine starts, the engine will be inhibited from stopping while the moving average of the accelerator pedal position remains above the threshold.

As can be seen in FIG. 3B, the moving average of the accelerator pedal position remains above the inhibit pull-down threshold past $t_1$ and all the way until $t_5$. This means that the engine remains on even throughout the erratic accelerator pedal movement that was described above and shown in FIG. 3A. It is not until a time $t_5$ that the moving average of the accelerator pedal position reduces below the inhibit pull-down threshold. At this time, the control system can allow the engine to pull down, or stop, if the driver demands are such that stopping the engine would increase efficiency. Thus, the control logic illustrated in FIGS. 2 and 3B avoids the additional engine shutdown at time $t_2$ and immediate start-up at time $t_3$ in FIG. 3A.

Figure 4A:
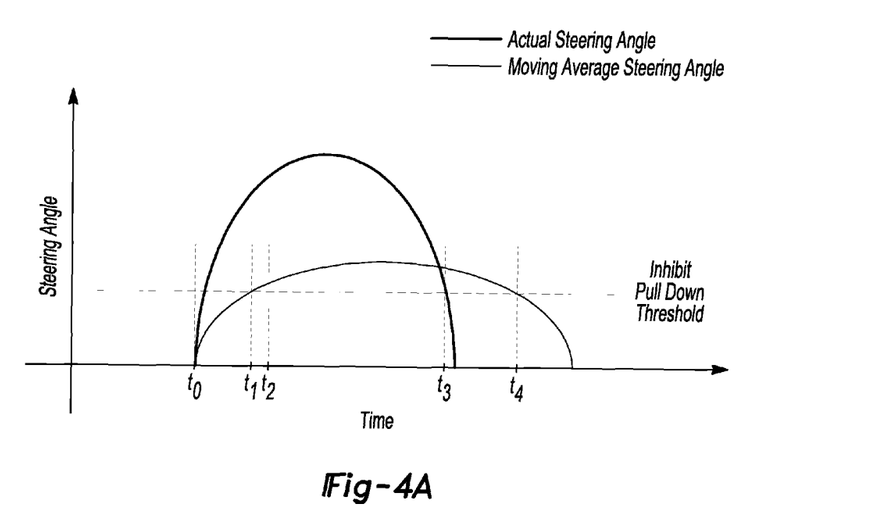
Figure 4B:
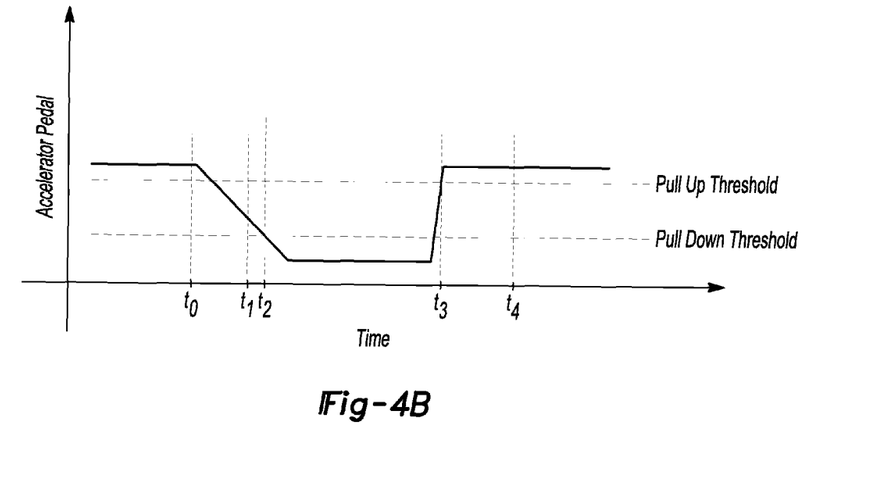
FIG. 4B is a graphical illustration of comparing accelerator pedal position to two different thresholds.

Referring to FIGS. 4A and 4B, similar constrains are placed on the engine pull-down activity, except now with respect to steering angle. The steering angle or steering wheel angular position can be determined based on one or more sensors on or near the steering wheel of the vehicle. Similar to the accelerator pedal position example above, a moving average of steering angle positions can be calculated as $$Y = \frac{\sum (W_i * X_i)}{\sum W_i}$$

where Y is the weighted average steering angle, W is the weights as a function of past numbers (N) of time intervals, and X is the past number (N) of steering angle position values with weights placed more heavily on data that is the nearest past.

FIGS. 4A and 4B illustrate a scenario where the vehicle enters a corner with the engine on, e.g., when the vehicle is in the hybrid mode or engine-only mode. A typical driver may tip out on the accelerator pedal while entering the turn, which would normally result in the controller issuing an engine pull-down command, as illustrated at time $t_2$ in FIG. 4B with the accelerator pedal position falling below the pull-down threshold. As the vehicle exits the corner, the driver may tip in on the accelerator pedal again, which would cause a corresponding engine-start command at time $t_3$ with the accelerator pedal position exceeding the pull-up threshold.

However, if the moving average algorithm explained above is used by the control system, this momentary engine shutdown followed quickly by an engine pull-up can be avoided. Referring to FIG. 4A, when the vehicle is being driven in a straight line, the moving average of the steering angle is 0. This is shown prior to time $t_0$. The vehicle enters the turn at time $t_0$. Shortly thereafter, at time $t_1$, the moving average of the steering angle increases above an "inhibit pull-down threshold" that can be calibrated (like the inhibit pull-down threshold in FIG. 3B). While the moving average of the steering angle remains above this threshold, the controls will inhibit or prevent the engine from pulling-down, regardless of accelerator pedal position or other factors. This is because the control system is programmed to understand that a turn is typically followed by an accelerator pedal movement while the car is moving, and so it can be inferred that driver demands may increase shortly after the steering angle is returned back to 0.

This is illustrated in FIGS. 4A and 4B. As the vehicle exits the turn, the accelerator pedal may be increased above the pull-up threshold at time $t_3$. This would normally cause the controller to activate the engine. However, due to the moving average of the steering angle still exceeding the inhibit-pull-down threshold, the engine remains on. The moving average of the steering angle finally falls below the inhibit-pull-down threshold at time $t_4$, but at this time the driver has (as predicted) increased the accelerator pedal to continue driving. Thus, the engine remains on throughout the curve rather than stopping and starting simply based on accelerator pedal position. The control strategy thus prevents an engine stop and engine start (at times $t_2$ and $t_3$, respectively) that would otherwise occur without the moving average of steering angles.

Comparing the actual steering angle position to the moving average of the steering angle positions, this also delays the time for when the engine can be allowed to shut down. This can also reduce unwanted engine starts and stops, and increase drivability.

Figure 5A:
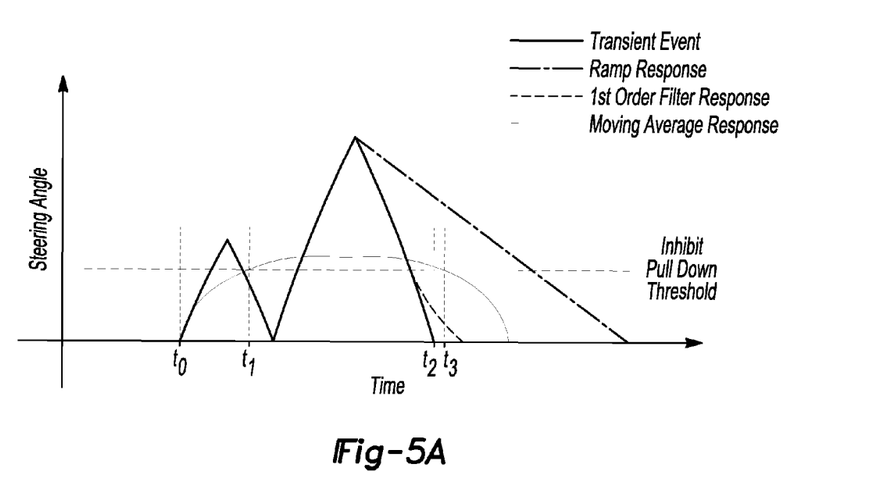
Figure 5B:
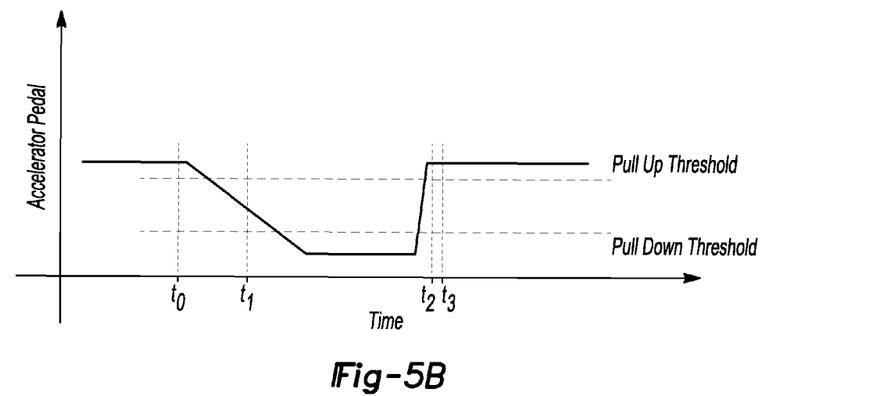
FIG. 5B is a graphical illustration of comparing accelerator pedal position to two different thresholds.

FIGS. 5A and 5B are identical to FIGS. 4A and 4B, except to illustrate the effect of varying steering angle positions throughout multiple turns. FIG. 5A may be, for example, a sharp turn followed by an even sharper turn. As can be seen, the actual steering angle can quickly increase and decrease back to zero during the first turn. During the subsequent turn, the steering angle position reaches a higher point during a sharper turn. The moving average of the steering angle increases above the inhibit-pull-down threshold at time $t_1$, and remains above the threshold even while the actual steering angle reduces back to zero for a second time at time $t_2$. The engine remains inhibited from stopping until time $t_3$ when the moving average of the steering angle reduces below the inhibit-pull-down threshold.

Benefits of a moving average (such as a weighted moving average) are highlighted in the example of FIG. 5A. A first-order filter is standard and typically implemented in various vehicular technologies. If a simple first-order filter were implemented in the control system rather than the moving average of steering angle position, sharp movements and transients in the actual steering angle are mostly followed until the very end where the filter phases out. This would result in crossing the inhibit-pull-down threshold (or multiple thresholds) multiple times, allowing undesirable engine starts and stops accordingly. A typical ramp filter is also illustrated. The transients in the steering angle load the ramp filter, and the ramp filter slowly "unloads" after the peak in the actual steering angle position and filters down from this magnitude. This again allows multiple engine starts and stops during the turns, and delays the time in which the engine can be allowed to stop (as shown by the long delay until the ramp filter falls below the inhibit-pull-down threshold.)

By utilizing a moving average of the steering angle, the engine is inhibited from stopping during both turns. In particular, the accelerator pedal position drops below the pull-down threshold at a time after time $t_1$. However, at time $t_1$, the moving average has increased to exceed the inhibit pull-down threshold. So, the engine remains on and is inhibited from pulling down.

Similar moving averages can be placed on road grade data when driving to inhibit the engine from shutting down. For example, the same calculation can be used:

$$Y = \frac{\sum (W_i * X_i)}{\sum W_i}$$

Where Y is the estimated road grade at the next time instance, W is the weights placed on the road grade as a function of the number (N) of past time intervals, and X is the past number (N) of road grade values. If the vehicle is being driven uphill, Y can represent a weighted average road grade over past few samples. A negative change in actual road grade can result in less torque required to propel the vehicle which, in turn, results in the controller issuing an engine pull-down command. However, using this control strategy, the engine pull-down command is inhibited from being realized for a next few instances until Y falls below a threshold or a calibratable timer expires. This control improves fuel efficiency and drivability during times when the change in road grade is temporary, due to the delay in shutting down the engine causing a prevention of unnecessary engine stop/start busyness.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The invention claimed is:

1. A vehicle comprising:
    a steering wheel with an associated steering wheel angle sensor;
    an engine;
    a transmission;
    a motor-generator capable of providing drive torque, selectively coupled to the engine via a clutch, and selectively coupled to the transmission; and
    a controller programmed to inhibit the clutch from disengaging and the engine from stopping based on a moving average of previous steering wheel angle positions exceeding a threshold.

2. The vehicle of claim 1, wherein the controller is further programmed to disengage the clutch and stop the engine in response to the moving average falling below the threshold.

3. The vehicle of claim 1, wherein the controller is further programmed to initiate a timer in response to an engine-off request, and wherein the controller is further programmed to, subsequent to receiving the engine-off request and while the moving average exceeds the threshold, disengage the clutch and stop the engine in response to the timer expiring.

4. The vehicle of claim 1, wherein the controller is further programmed to inhibit the clutch from disengaging and the engine from stopping based on the moving average exceeding the threshold regardless of an accelerator pedal position or a brake pedal position.

5. The vehicle of claim 1 further comprising an accelerator pedal with an associated pedal position sensor, wherein the controller is further programmed to inhibit the clutch from disengaging and the engine from stopping based on a moving average of previous pedal position magnitudes exceeding a pedal-position threshold.

6. The vehicle of claim 1, wherein the moving average is a weighted moving average.

7. A vehicle comprising:
    an accelerator pedal with an associated pedal position sensor;
    an engine;
    a transmission;
    a motor-generator capable of providing drive torque, selectively coupled to the engine via a clutch, and selectively coupled to the transmission; and
    a controller programmed to inhibit the clutch from disengaging and the engine from stopping based on a moving average of previous pedal position magnitudes exceeding a threshold.

8. The vehicle of claim 7, wherein the controller is further programmed to enable the clutch to disengage and the engine to stop in response to the moving average of the previous pedal position magnitudes falling below the threshold.

9. The vehicle of claim 8, wherein the controller is further programmed to initiate a timer in response to an engine-off request.

10. The vehicle of claim 9, wherein the controller is further programmed to initiate a timer in response to an engine-off request, and wherein the controller is further programmed to, subsequent to receiving the engine-off request and while the moving average exceeds the threshold, disengage the clutch and stop the engine in response to the timer expiring.

11. The vehicle of claim 7 further comprising a steering wheel with an associated steering wheel angle sensor, wherein the controller is further programmed to inhibit the clutch from disengaging and the engine from stopping based on a moving average of previous steering wheel angle positions exceeding a steering-wheel-angle threshold.

12. The vehicle of claim 7, wherein the moving average is a weighted moving average.

13. A method of inhibiting engine pull-down in a vehicle, comprising:
    via at least one controller,
        receiving a signal indicative of driving-condition data relating to road grade, accelerator pedal position, or steering wheel position;
        initializing a timer in response to an engine-stop request; and
        subsequent to the initializing, inhibiting the engine from stopping based on a moving average of the driving-condition data and the timer being unexpired.

14. The method of claim 13, wherein the inhibiting includes inhibiting the engine from stopping based on the moving average of the driving-condition data exceeding a threshold.

15. The method of claim 14 further comprising, via the at least one controller, stopping the engine in response to the timer expiring while the moving average of the driving-condition data exceeds the threshold.

16. The method of claim 13, wherein the vehicle includes a clutch selectively coupling the engine to a motor-generator capable of providing drive torque, and wherein the inhibiting includes inhibiting the clutch from disengaging.

17. The method of claim 16 further comprising, via the at least one controller, disengaging the clutch and stopping the engine in response to the moving average of the driving-condition data falling below a threshold.

* * * * *